V. H. McNUTT.
CHART FOR USE IN DETERMINING MINERALS AND OTHER SUBSTANCES.
APPLICATION FILED APR. 15, 1913.
1,087,174.
Patented Feb. 17, 1914.
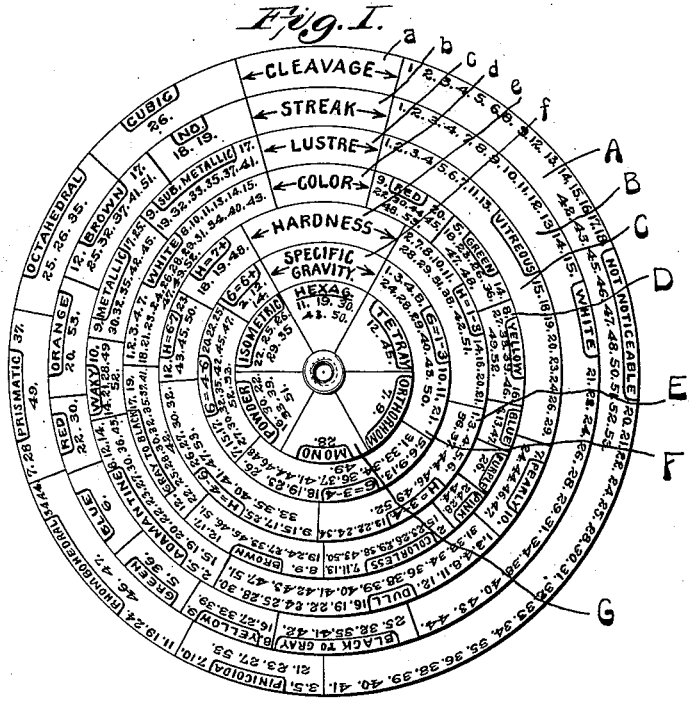
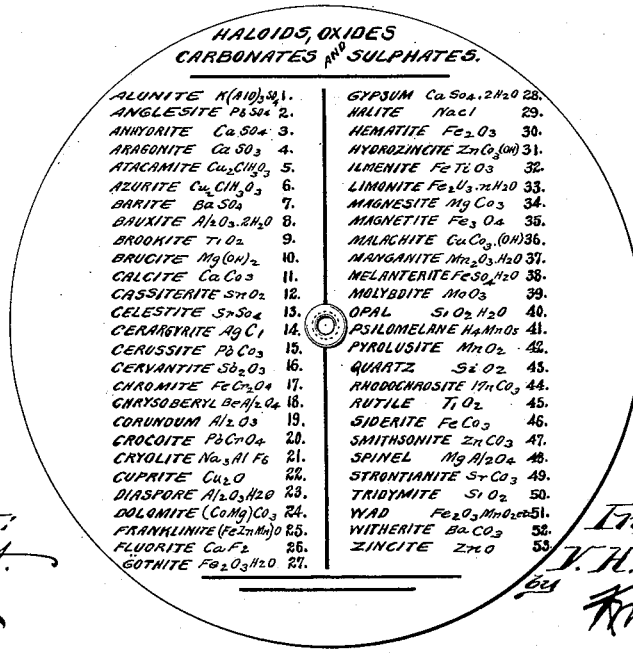

UNITED STATES PATENT OFFICE.

VACHEL H. McNUTT, OF ROLLA, MISSOURI.

CHART FOR USE IN DETERMINING MINERALS AND OTHER SUBSTANCES.

1,087,174.  Specification of Letters Patent.  Patented Feb. 17, 1914.

Application filed April 15, 1913. Serial No. 761,187.

*To all whom it may concern:*

Be it known that I, VACHEL H. McNUTT, a citizen of the United States of America, residing at Rolla, county of Phelps, and State of Missouri, have invented certain new and useful Improvements in Charts for Use in Determining Minerals and other Substances, of which the following is a full, clear, and exact description, reference being had to the accompanying drawings, forming a part of this specification.

My invention relates to a chart for use more particularly in determining minerals through study of their distinctive properties.

Figure I is a face view of my chart. Fig. II is a cross section through the chart. Fig. III is a rear view of the chart.

My chart in the form illustrated in the drawings comprises a plurality of disks, disposed one above another, the disks being of gradually increasing diameters from the topmost to the lowermost, and being all individually rotatable around a common axis. These disks are representative, separately, of various distinctive properties of minerals to be studied. When arranged as shown in the drawings, the larger disk, A, is representative of "cleavage"; the next disk, B, is representative of "streak"; the next, C, of "luster"; the next, D, of "color"; the next, E, of "hardness"; the next, F, of "specific gravity"; and the topmost disk, G, of "crystalline form." These disks have words or symbols on their exposed portions, at *a, b, c, d, e, f, g,* denoting the characteristic properties of various minerals.

The exposed portion of each disk is subdivided into a plurality of subdivisions indicative of varying natures of the properties represented by the disks. For example, different subdivisions on the disk A indicate cleavage "not noticeable", and "cubic" cleavage; different subdivisions on the disk B indicate "white" streak, and "black to gray" streak. Different subdivisions on the disk C indicate "vitreous" and "metallic" luster; different subdivisions on the disk D indicate "gray to black" and "red" color; different subdivisions on the disk E indicate different degrees of "hardness", such as "H=6—7" and "H=1—3."

An essential to the use of my chart is a table of minerals of certain genus or species, a table of this kind being, for convenience, placed upon the back of my chart, (see Fig. III). This table includes the names of a variety of minerals classifiable under the heading at the top of the table, and each of which is known by a symbol, such as a number located opposite the name. These symbols are made use of in the proper subdivisions on the disks of the chart, according to the native characteristics of the mineral; as, for illustration, if the mineral has a "prismatic cleavage", its symbol is placed in the "prismatic" subdivision of the "cleavage" disk A. If the mineral has, by nature, a white streak, its symbol is placed in the "white" subdivision of the streak disk B, and so on, throughout the chart.

In the use of my chart, the steps taken to determine a mineral are steps involving elimination, symbols in the subdivisions placed in registration, and deduction after manipulation of the disks to place the proper subdivisions, according to the properties of the mineral under examination, and which are provided on the various disks A, B, C, etc.

We will now assume, for example, that a specimen of a mineral is in the hands of a user of the chart and he desires to determine what the mineral is from a consideration of its properties. It being first noted that there is no noticeable cleavage in the mineral, the user of the chart first located the "not noticeable" subdivision of the "cleavage" disk, and uses this as a basis to which adjustments of the other disks are made. He may then observe that the specimen has a black to gray streak and he moves the "black to gray" subdivision of the "streak" disk B into registration with the previously located subdivision of the "cleavage" disk; noticing that the luster of the specimen is metallic, he adjusts the "luster" disk C so as to bring the "metallic" subdivision thereon opposite the previously adjusted "black to gray" subdivision; then observing that the color of the specimen is black to gray, he adjusts the black to gray subdivision of the "color" disk to the previously adjusted subdivisions; and finding that the hardness of the specimen is H=1—3, he adjusts the "H=1—3" subdivision of the "hardness" disk so that it stands opposite the other subdivisions of the other disks which have been placed in registration with each other. Now by comparison of the mineral indicating symbols in the various subdivisions of disks brought into registration with each other, the user is enabled to quickly eliminate all the symbols except such as appear in common on all of the subdivisions in registration, steps in this connection being the most readily accomplished by starting with the subdivision having the fewest number of symbols therein and ascertaining from one to another subdivision in registration whether they appear in the other registering subdivisions. In the example cited he will determine by elimination steps that the symbol 42 is the only one appearing in all of the subdivisions that have been brought into registration; and upon referring to the table of minerals, will learn that the mineral is pyrolusite, inasmuch as this mineral is designated by the numeral 42 in the table of minerals.

While I have herein described my chart as used to determine minerals, it is evident it may be used in determination of other substances, or in other lines of search, where classification according to properties, for the purpose of determination of an unknown, is attempted; such, for illustration, as bacteriological, botanical, etc., determinations, as a substitute for the present tables for determination of unknown substances, now issued in book or leaf form.

I claim:—

A chart of the character described, comprising a plurality of members movable relative to each other, said members having thereon designations of properties of a variety of certain substances to be determined and being subdivided into divisions indicating natures of the properties of the substances to be determined, the divisions having symbols therein indicative of said variety of substances.

VACHEL H. McNUTT.

In the presence of—
JULIUS W. EGGLESTON,
J. CUNNINGHAM.

---

Copies of this patent may be obtained for five cents each, by addressing the "Commissioner of Patents, Washington, D. C."